(12) United States Patent
Bertozzini

(10) Patent No.: US 11,974,700 B2
(45) Date of Patent: May 7, 2024

(54) HANDLE FOR A KITCHEN OBJECT

(71) Applicant: TVS S.p.A., Fermignano (IT)

(72) Inventor: Giuseppe Alberto Bertozzini, Pesaro (IT)

(73) Assignee: TVS S.P.A., Fermignano (IT)

(*) Notice: Subject to any disclaimer, the term of this patent is extended or adjusted under 35 U.S.C. 154(b) by 428 days.

(21) Appl. No.: 16/996,223

(22) Filed: Aug. 18, 2020

(65) Prior Publication Data
US 2021/0235938 A1    Aug. 5, 2021

(51) Int. Cl.
*A47J 45/07* (2006.01)
*B29C 45/14* (2006.01)
*B29C 45/26* (2006.01)
*B29K 101/12* (2006.01)
*B29K 309/08* (2006.01)
*B29L 31/46* (2006.01)

(52) U.S. Cl.
CPC ........... *A47J 45/071* (2013.01); *A47J 45/072* (2013.01); *B29C 45/14336* (2013.01); *B29C 45/26* (2013.01); *B29K 2101/12* (2013.01); *B29K 2309/08* (2013.01); *B29L 2031/463* (2013.01)

(58) Field of Classification Search
CPC . A47J 45/071; A47J 45/072; B29C 45/14336; B29C 45/26; B29K 2101/12; B29K 2309/08; B29L 2031/463

USPC .................................................. 220/752, 753
See application file for complete search history.

(56) References Cited

U.S. PATENT DOCUMENTS

| | | | |
|---|---|---|---|
| 2006/0000322 A1* | 1/2006 | Tozer | A61L 2/18 81/489 |
| 2008/0014412 A1* | 1/2008 | Hortnagl | B29C 45/1676 428/172 |
| 2008/0229585 A1* | 9/2008 | Kelly | A47J 43/281 30/142 |
| 2008/0245805 A1* | 10/2008 | Ferron | A47J 45/08 220/573.1 |

FOREIGN PATENT DOCUMENTS

| | | | | |
|---|---|---|---|---|
| CN | 203195519 U | * | 9/2013 | |
| CN | 107080478 A | * | 8/2017 | A47J 27/002 |
| EP | 2045046 A1 | * | 4/2009 | B25G 1/102 |
| EP | 3995282 A1 | * | 5/2022 | A61C 17/20 |
| KR | 200316491 Y1 | * | 6/2018 | |
| WO | WO-0044269 A1 | * | 8/2000 | A47J 45/071 |
| WO | WO-2013177066 A1 | * | 11/2013 | A47J 27/13 |

* cited by examiner

*Primary Examiner* — J. Gregory Pickett
*Assistant Examiner* — Niki M Eloshway
(74) *Attorney, Agent, or Firm* — Tutunjian & Bitetto, P.C.

(57) ABSTRACT

A handle for a kitchen object is provided, including a part for attachment or connection to an object made of phenol resin, an intermediate part which winds around and partially incorporates the part for attachment or connection, and an external part or skin for covering or coating the intermediate part.

20 Claims, 4 Drawing Sheets

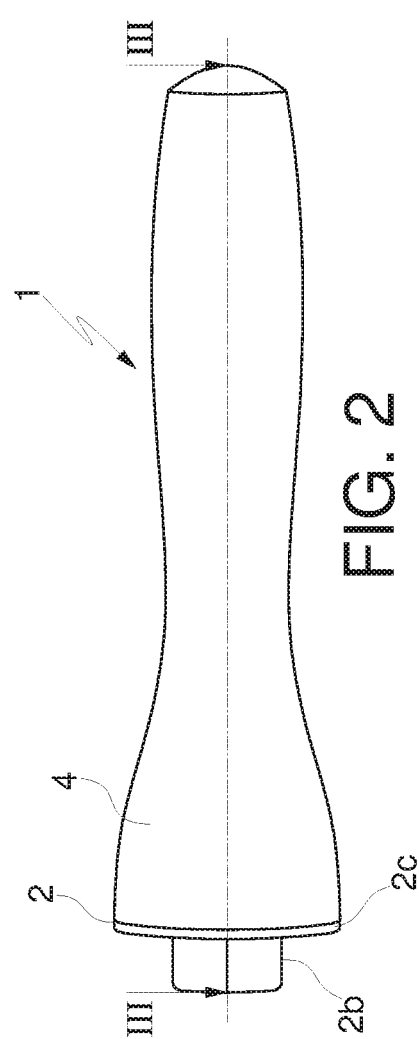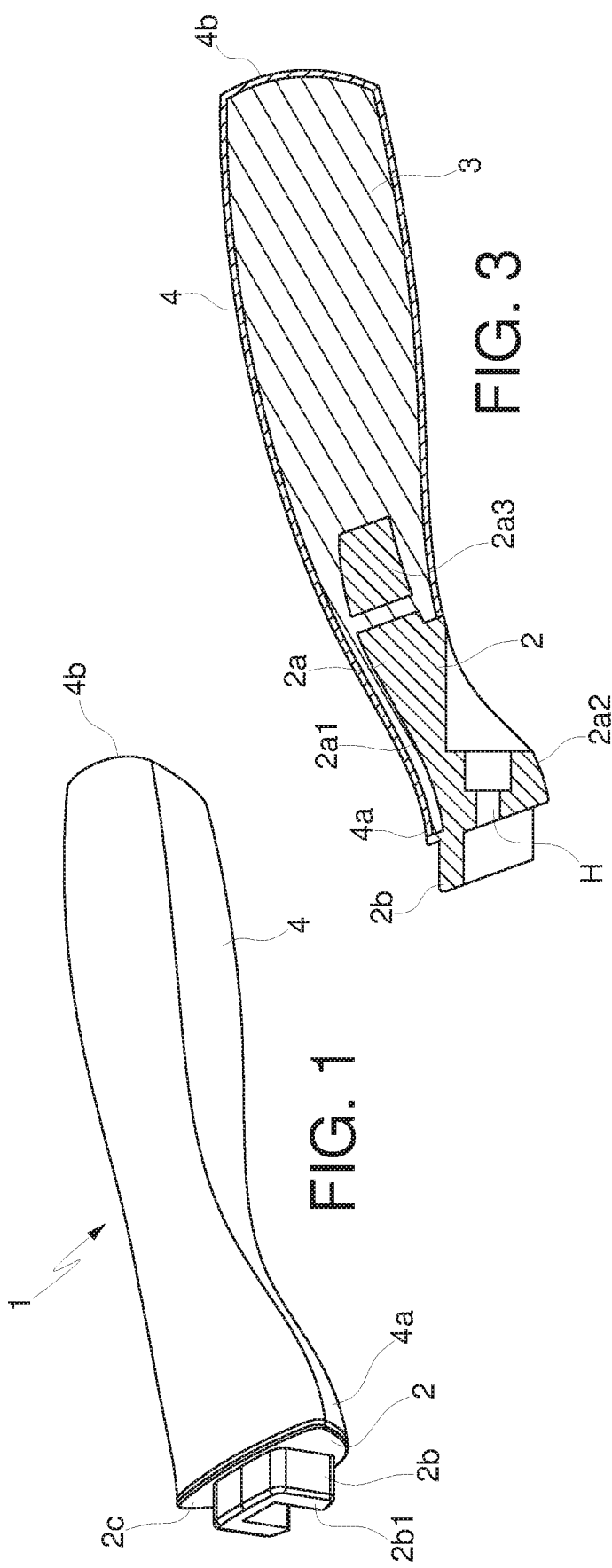

HANDLE FOR A KITCHEN OBJECT

TECHNICAL FIELD OF THE INVENTION

The present invention relates to a handle for a kitchen object, such as a pan, a bowl, a saucepan, a frying pan, a wok, a grill pan, a lid, a pot, a container as well as a kitchen object provided with such a handle.

The present invention also relates to a new method and mold for making a handle for a kitchen object.

STATE OF THE PRIOR ART

Handles are known used for gripping pots, pans, frying pans, and the like, which traditionally comprise a gripping element associated with anchoring means to the pots, and the like, even with different sizes and thicknesses.

A first problem of known handles is the relative construction complexity and thus also the high production cost.

Moreover, these handles are usually made of thermosetting material and by their nature they are not recyclable or in any case are partially reusable, but only for niche applications.

Furthermore, the standard handles are difficult to customize or anyway decorate.

SUMMARY OF THE INVENTION

An object of the present invention is to provide a new handle for a kitchen object.

Another object of the present invention is to provide a handle for a kitchen object that is eco-sustainable, both in terms of the source of obtaining the materials used, and in terms of their recyclability.

A further object of the present invention is to provide a handle for a kitchen object whose aesthetics, depending on its components, can be varied in a simple and economical way.

Another object of the present invention is to provide a handle for a kitchen object which has an attachment part with good thermal resistance as well as good mechanical properties at high temperature.

A further object of the present invention is to provide a handle for a kitchen object with an external part, which is aesthetically pleasant and flame resistant.

Another object of the present invention is to provide a new method and a new mold for making a handle for a kitchen object.

Another object of the present invention is to provide a method and a mold for making a handle for a kitchen object, which allow to automate and speed up the production of one or more handles.

According to an aspect of invention, a handle according to the present application is provided for.

The present application refers to preferred and advantageous embodiments of the invention.

BRIEF DESCRIPTION OF THE DRAWINGS

Other characteristics and advantages of the invention will be more apparent from the description of embodiments of a handle and mold, illustrated by way of example in the attached drawings wherein:

FIG. 1 is a slightly top perspective view of a handle according to the present invention, FIG. 2 is a top view of the handle of FIG. 1, FIG. 3 is a view taken along the line III-III of FIG. 2, FIGS. 4 and 5 are schematic views of a first mold according to the present invention.

In the attached drawings, identical parts or components are distinguished using the same reference numbers.

DETAILED DESCRIPTION OF THE INVENTION

Figure 4:
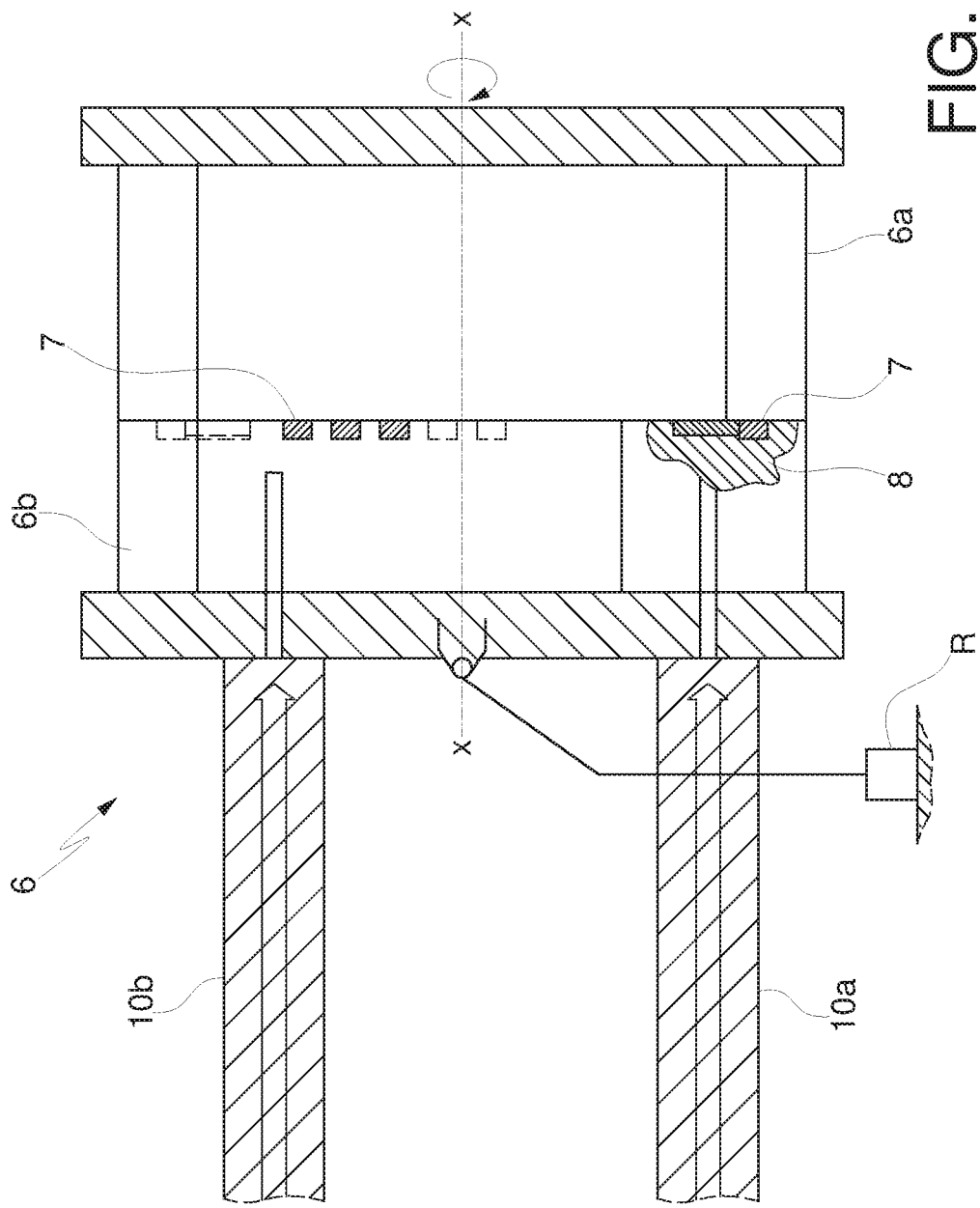

With reference first to FIGS. 1 to 3, a handle for a kitchen object (not shown in the drawings), if desired for cooking foodstuff is shown. A kitchen object according to the present invention can be for example a pan, a bowl, a saucepan, a frying pan, a wok, a grill pan, a lid, a pot or a container.

The handle comprises a part for attachment or connection 2 to an object made of phenol resin, more particularly of Bakelite, which is a thermosetting phenolic resin. In particular, this material ensures good thermal resistance, but mainly good mechanical properties at high temperature, this should the handle 1 be used so as to be placed on or near a heat source for long times, for example 1 hour.

The attachment or connection part 2 can allow a snap constrain, a fitting constrain and/or a constrain with screws or other suitable means to a respective kitchen object.

The handle 1 then includes an intermediate part or inner 3, which winds around and partially incorporates the attachment or connection part 2.

The intermediate part is made of at least one material selected from the group constituted by PA (polyamide), PET (polyethylene terephthalate), PP (polypropylene), PE (polyethylene), ABS (acrylonitrile-butadiene-styrene), polystyrene (PS) and other materials or thermoplastic polymers or mixtures thereof, with addition of reinforcement fibers, such as glass fibers. If desired, the intermediate part 3 is made of Nylon (PA66) loaded with glass fibers.

The handle 1 is then provided even with an external part or skin 4 for covering or coating the intermediate part 3, which external part 4 is made of at least one material selected from the group constituted by PBT (polybutylene terephthalate), PA (polyamide) and other materials or thermoplastic polymers or mixtures thereof.

Therefore, the external part 4 is made of a techno-polymer with high aesthetic performance, flame resistance with the possibility of taking on different colors in molding, without the need to apply an external layer of paint.

In particular, according to a non-limiting embodiment, the melting temperature of the material for making the external part 4 is lower than the melting temperature of the material for making the intermediate part 3, this in particular in order not to have problems of "dragging" of the color while obtaining the handle from the inside towards outside.

The attachment part 2 can constitute between 20% and 25% by weight of the total weight of the handle, if desired 23%.

The intermediate part 3 can constitute between 65% and 75% by weight of the total weight of the handle, if desired 70%.

The external part 4 constitutes between 5% and 10% by weight of the total weight of the handle, if desired 7%.

Thus, for example, the handle 1 could have an attachment part 2 of about 48-50 g, for example 49 g, the intermediate part 3 of about 148-150 g, for example 149 g, and the external part 4 of about 14-16 g, for example 15 g.

If desired, the attachment part 2 is constituted by recycled organic material in a quantity by weight greater than 30% or 40% of the respective total. In this regard, the attachment part 2 could be made up of 40% by weight of recycled organic material, with the function of filler.

In this regard, the intermediate part 3 can be made of a material that is substantially completely recycled.

If desired, the recyclability of the handle 1 can be at the same % of the recycled material used. In this case, for example with a hot process, the recyclable part could be separated from the non-recyclable part.

According to the nonlimiting embodiment shown in the figures, the attachment part comprises a first section 2a partially embedded within the intermediate part 3 and a second section 2b projecting from the latter and defining a portion 2b1 for constraining to a respective part of a kitchen object.

More specifically, the projecting section 2b can for example define a C-shaped section defining the constraint portion 2b1.

The first section 2a can be configured as a block, if desired curved and such as to follow the overall extension of the handle 1.

The attachment part 2 can also have a flanged section 2c between the first section 2a and the second section 2b.

The first section 2a can then have, starting from the second section 2b or rather from the flanged section 2c, a first segment 2a1 with a higher cross section defining a respective section of the external face of the handle 1 at the bottom or in any case at a respective face 2a2 and, if desired a second segment 2a3 entirely embedded within the intermediate part 3 and having a cross section smaller than the first segment 2a1.

So far as the external part or skin 4 is concerned, it can be shaped as a sock, and thus with an open terminal end 4a and a substantially closed opposite end 4b.

In this case, the terminal end 4a wraps, with the interposition of the intermediate part, also the first segment 2a1 of the first section 2a and ends in contact with or near the flanged section 2c or rather the outer edge thereof.

However, the terminal end 4a of the external part or skin 4 can also be non-tubular and have a lower, in use, window or recess, in which part of the first segment 2a1 is arranged, so that the respective face 2a2 of the same protrudes towards the outside and actually constitutes a continuation of the external face of the outer wall or skin 4.

With such a structure, the positioning or housing area of the intermediate part 3 is actually defined between the first portion 2a, the flanged portion 2c and the external part 4.

If desired, the attachment part 2 and the external part 4 envelop or enclose or cover the intermediate part 3 for its entire extension, although this may not happen.

One or more holes H or the like for the insertion of screws or means of attachment with a kitchen object can be delimited in the handle 1 and in particular in the attachment part 2.

A handle 1 according to the present invention can have any suitable shape, for example with an elongated body or not according to requirements.

It has been possible to ascertain that a handle 1 according to the present invention is suitable for passing all the tests required by the regulations in force, such as the UNI EN 12983-1: 2005 and UNI CEN_TS 12983-02_2006 standards.

Such a handle was also left, tied to a respective object (pan) empty or without food, on a gas heat source at maximum power for about 30 minutes. Well, it turned out that the handle subjected to this test was not broken and still guaranteed the necessary mechanical properties.

The present invention also includes a kitchen object (not shown in the drawings), which has a main part for containing or covering foods and a handle 1 constrained, for example constrained by snap, fitting and/or screws or other suitable means at the attachment part to the main part of the object.

The main part of the object can be a shell or bowl component or cap for containing, in use, of food.

In this case, the object can include a section protruding or cantilever from the main part, which protruding section is designed to be constrained, for example by snap action or by fitting insertion or by screws, with the attachment part 2, if desired with the portion of constraint 2b1 of the latter.

In accordance with the present invention, a method and a mold (see in particular FIGS. 4 and 5) are also provided for obtaining at least one handle 1 for a kitchen object, such as a pan, a bowl, a saucepan, a frying pan, a wok, a grill pan, a lid, a pot or a container, which handle 1 comprises a part for attachment or connection 2 to a kitchen object, an intermediate part 3 which winds around and partially incorporates the attachment or connection part 2 and an external part 4 for covering or coating the intermediate part 3.

Such handle can be for example, but it is not required, as above described.

This method particularly comprises the following steps:
making at least one attachment part 2, if desired by means of the above-indicated materials, for example by molding in a special press (not shown in the figures), if desired, by injection and subsequent unloading of the attachment part from this press,
loading such attachment part/s 2 on a first component, for example a male component 7 of a mold 6 in open position, which first component 7 is shaped so as to suitably support or house the attachment part 2, for example at a respective second section 2b of the latter,
closing the mold 6 or better yet engaging the first component 7 by means of a second component or second female component 8 of the mold in a first closed position, so as to define a first molding impression around the attachment part 2, in particular around a first section 2a of the same,
molding, for example by injection by means of a suitable first injector 10a, in the first impression defined by the first component 7 and by the second component 8 in a first closed position, an intermediate part 3 around the or a respective attachment part 2 or rather the first section 2a thereof,
opening the mold 6 or better yet moving apart the first 7 and the second 8 component and closing the mold or better yet engaging the first component 7 in a second closed position by means of a third component or third female component 9, so as to define a second molding impression around the attachment part 2, in particular around a first section 2a of the same that is provided or coated with the intermediate part 3,
molding, for example by injection by means of a suitable second injector 10b, in the second impression defined by the first component 7 and by the third component 9 in a second closed position, at least one external part 4 around the intermediate part 3 so as to obtain at least one handle,
opening the mold 6 or rather the first 7 and the third 9 component and unloading the handle 1 obtained or the handles 1 obtained from the second impression.

Clearly, one could also have a first female component and a second and third male component.

If desired, the mold 6 comprises a first element or half-mold 6a including the first component 7 and a second element or half-mold 6b including the second 8 and third 9 components, in which case the second 8 and third 9 components are angularly offset or arranged in areas, respectively 8a, 9a, of the second element or half-mold 6b which are angularly offset from each other.

In this case, the first 6a and/or the second 6b element or half-mold are/is rotatably mounted around a rotation axis x-x, such that by rotating the first 6a or the second 6b element around the respective rotation axis x-x, while the other element, second 6b or first 6a, is kept stationary, it is possible to bring the first component 7 to face and hence alternately engage or close the second 8 and the third 9 component.

If desired, the second element or half-mold 6b also comprises a zone for loading 11 the attachment part 2, i.e. a zone where the attachment part (s) 2 is/are loaded.

The loading zone 11 is angularly offset with respect to the second 8 and the third component 9 or rather to the respective zones 8a, 9a, such that by rotating the first 6a or the second 6b element around the respective rotation axis x-x, if desired while the other element or half-mold, second 6b or first 6a, is kept stationary, it is possible to bring the first component 7 to alternatively face and thus engage the loading zone 11, the zone 8a where the second component 8 is arranged and the zone 9a where the third component 9 is arranged.

Clearly, the mold 6 comprises motor means for rotating the first 6a or the second 6b element or half-mold around the axis x-x. Moreover, the mold 6 could also include means for relative displacement of the first 6a or the second 6b element or half-mold in the direction of the axis x-x so as to be able to approach-move away the elements 6a, 6b and thus the respective components 7, 8 and 9 along this axis x-x.

The loading phase of the attachment part 2 can also be carried out manually or by means of a special robot R.

Special heaters of the zones 8a or 9a can also be provided.

Moreover, the mold 6 could also comprise two or more first components 7, so that at least two of the following steps can be carried out simultaneously:

loading at least one attachment part 2 on a first component or in a respective loading zone 11, closing the second component 8 close to a respective first component 7 and then molding at least one intermediate part 3 around an attachment part 2, and closing by means of a third component 9 close to a respective first component 7 and molding of at least one external part 4 around an intermediate part 3 so as to obtain at least one handle 1.

A mold 6 according to the present invention can be controlled by means of a suitable control unit.

Basically, in accordance with a method and a mold 6 according to the present invention, while a final or intermediate stage of manufacturing a handle 1 is being carried out, a new manufacturing cycle or rather the loading of at least one attachment part 2 on a male component 7 or in any case another manufacturing step is carried out (simultaneously) in another part of the mold.

It will also be understood that the or each first component 7 could be structured so as to simultaneously engage several attachment parts 2, while the second component 8 could be structured so as to delimit, together with a respective first component 7, a plurality of first impressions and the third component 9 could be structured so as to delimit, together with a respective first component, a plurality of second impressions.

Owing to this expedient, it would be possible to substantially produce several handles 1 at the same time.

Figure 6:
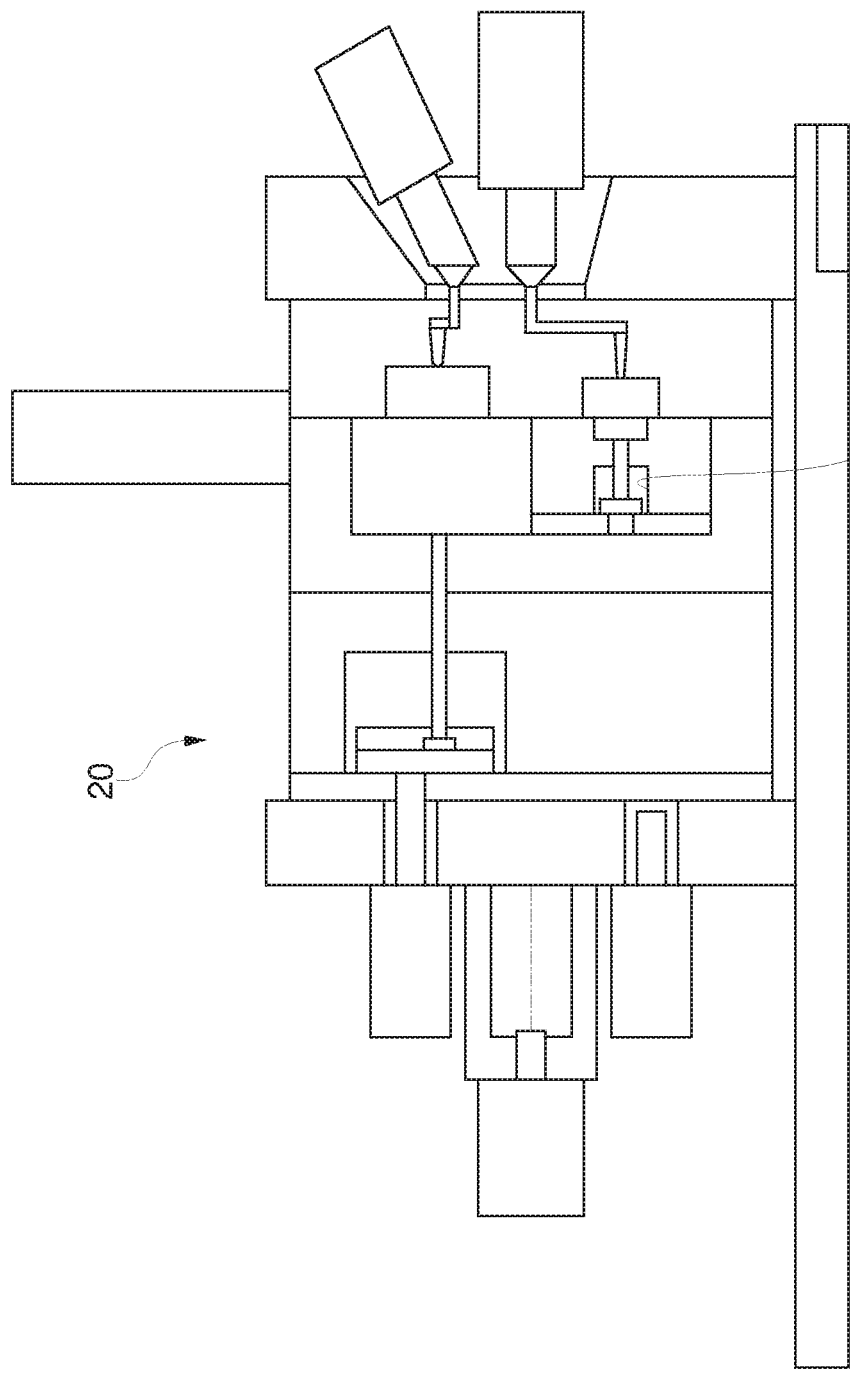
FIG. 6 is a schematic view of another mold according to the present invention.

According to another variant (see in particular FIG. 6), the handle 1 can be made by means of a method and a mold 20 with several molding impressions 21, in each of which the intermediate part 3 or the external part 4 is made being, so that it is then possible to extract the piece obtained from time to time to place it in another impression for the execution of a subsequent step of the method or unload the piece.

Therefore, this method consists of a molding carried out by several loading and unloading cycles.

In this case, 3 molds can be used, one for each part 2, 3 or 4 to be made.

This variant is actually a less automated alternative than the first described above.

As it will be possible to ascertain, a handle according to the present invention is environmentally sustainable, as it includes a high percentage of recyclable materials and can also be obtained from recycled materials, like all thermoplastic polymers that can be brought back to melting.

Moreover, thanks to the respective parts of the handle, a combination of thermal resistance, but above all good mechanical properties is obtained owing to the attachment part and the intermediate part and high aesthetic performance, flame resistance and the possibility of obtaining different final colors owing to the external part.

Figure 5:
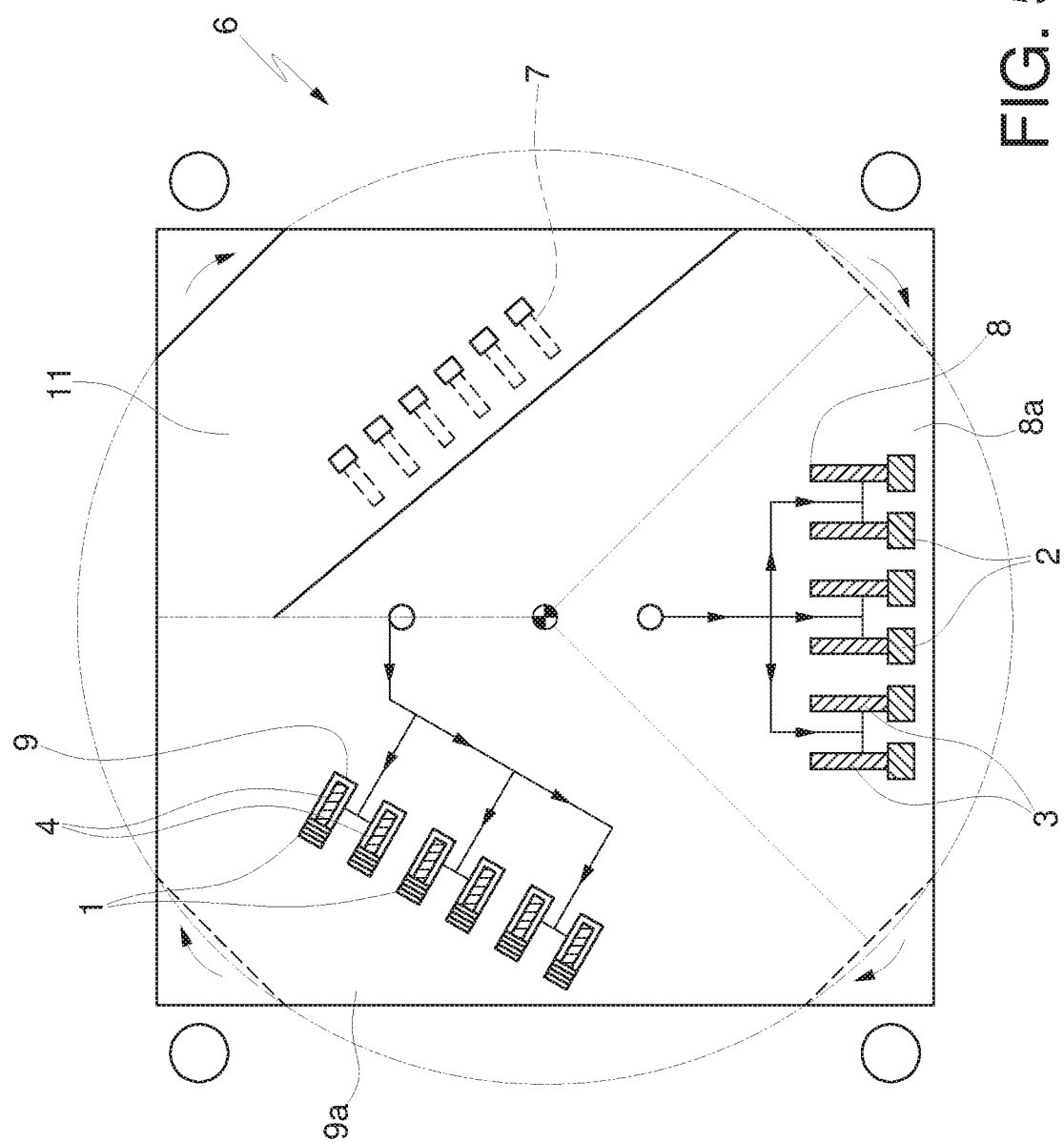

Moreover, thanks to a method and a mold as indicated above and illustrated in FIGS. 4 and 5, it is possible to automate and significantly speed up the production of one or more handles with respect to known solutions.

Modifications and variants of the invention are possible within the scope defined by the claims.

The invention claimed is:

1. A handle for an object for cooking, said handle comprising:

an attachment part made of phenol resin for attachment of the handle to an object, the attachment part comprising a first section partially embedded within the intermediate part and a second section projecting from the intermediate part, wherein said attachment part is provided only at a proximal end of the handle;

an intermediate part which winds around and partially incorporates said attachment part, said intermediate part being made of at least one material selected from the group constituted by PA (polyamide), PET (polyethylene terephthalate), PP (polypropylene), PE (polyethylene), ABS (acrylonitrile-butadiene-styrene), polystyrene (PS) and other thermoplastic materials or thermoplastic polymers or mixtures thereof, with addition of reinforcement fibers, an external part for covering or coating said intermediate part, said external part being made of at least one material selected from the group constituted by PBT (polybutylene terephthalate), PA (polyamide) and other thermoplastic materials or thermoplastic polymers or mixtures thereof.

2. The handle according to claim 1, wherein said reinforcement fibers comprise or are constituted by glass fibers.

3. The handle according to claim 1, wherein said attachment part constitutes between 20% and 25% by weight of the total weight of the handle.

4. The handle according to claim 1, wherein said intermediate part constitutes between 65% and 75% by weight of the total weight of the handle.

5. The handle according to claim 1, wherein said external part constitutes between 5% and 10% by weight of the total weight of the handle.

6. The handle according to claim 1, wherein said attachment or connection part is made of Bakelite.

7. The handle according to claim 1, wherein said intermediate part is made of Nylon (PA66) loaded with glass fibers.

8. The handle according to claim 1, wherein the melting temperature of the material for making said external part is lower than the melting temperature of the material for making said intermediate part.

9. The handle according to claim 1, wherein said attachment part is constituted by recycled organic material in a quantity by weight greater than 30% or 40% of the respective total.

10. The handle according to claim 1, wherein said intermediate part is made of material that is substantially completely recycled.

11. The handle according to claim 1, wherein said attachment part comprises a first section partially embedded within said intermediate part and a second section projecting from the latter and defining a portion for constraining to a respective part of a kitchen object.

12. The handle according to claim 1, wherein said attachment part and said external part wind around or enclose said intermediate part for the entire extension thereof.

13. A kitchen object having a main part for containing or covering foods and a handle according to claim 1 constrained at said attachment part to said main part of the object.

14. The handle of claim 1, wherein the intermediate part extends to a distal end of the handle.

15. The handle of claim 1, wherein the first section comprises, starting from the second section, a first segment with a cross section defining a respective section of an external face of a bottom of the handle, and a second segment entirely embedded within the intermediate part.

16. The handle of claim 15, wherein the second segment has a cross section smaller than the cross section of the first segment.

17. The handle of claim 1, wherein the second section comprises a constraint portion for constraining to a respective part of the object for cooking.

18. The handle of claim 17, wherein the constraint portion comprises a C-shaped section.

19. The handle of claim 1, wherein the first section comprises a block configured in a curved shape along an extension of the proximal end of the handle.

20. The handle of claim 1, wherein the external part is shaped as a sock, having an open terminal end and a substantially closed opposite end.

* * * * *